July 10, 1962

S. F. PROHASKA 3,043,010

FOOT MEASURING DEVICE

Filed Jan. 26, 1959

INVENTOR.
STEPHAN F. PROHASKA
BY
Adolph G. Martin
ATTORNEY

July 10, 1962 S. F. PROHASKA 3,043,010
FOOT MEASURING DEVICE

Filed Jan. 26, 1959 2 Sheets-Sheet 2

INVENTOR.
STEPHAN F. PROHASKA
BY Adolph G. Martin
ATTORNEY

United States Patent Office 3,043,010
Patented July 10, 1962

3,043,010
FOOT MEASURING DEVICE
Stephan F. Prohaska, 15036 Grand River,
Detroit 27, Mich.
Filed Jan. 26, 1959, Ser. No. 789,203
3 Claims. (Cl. 33—3)

This invention relates to foot measuring devices generally, and more particularly to a type of such device which can simultaneously provide measurements of the width, length and arch of the customer's feet.

In fitting shoes, it is common practice to measure only the length and width of a customer's feet. This practice, however, fails to take into consideration variations in the arches of customers having feet which are identical in length and width. Such variations in customer's feet make it necessary to use corrective measures to insure a comfortable fit when using stock shoes.

When the arch characteristics of a customer's foot are accurately known, suitable metatarsal pads or other suitable lifts can be provided to custom fit shoes made from a standard last. Most shoe shops, however, have no means for accurately measuring the customer's arches; consequently, the feet are required to adjust to the shape of the shoe. This required adjustment of the feet produces a certain amount of foot distortion, accompanied by extreme discomfort.

Cognizant of this situation, the applicant has, as the primary object of his invention, the provision of a device which will simultaneously provide an accurate measurement of the length, width and arch of the customer's feet.

Another object of the invention is the provision of a foot measuring device which can accurately provide a permanent printed impression of a customer's feet.

A further object of the invention if to provide a device of the type previously described, which is strongly constructed and relatively simple to operate.

Still another object of the invention is to provide a device of the type previously described, which is extremely compact and relatively inexpensive to produce.

Additional features and advantages of the invention will become apparent after thorough consideration of a detailed description and discussion of the same composed with reference to the accompanying drawings, constituting a portion of this application, and in which.

Figure 1:
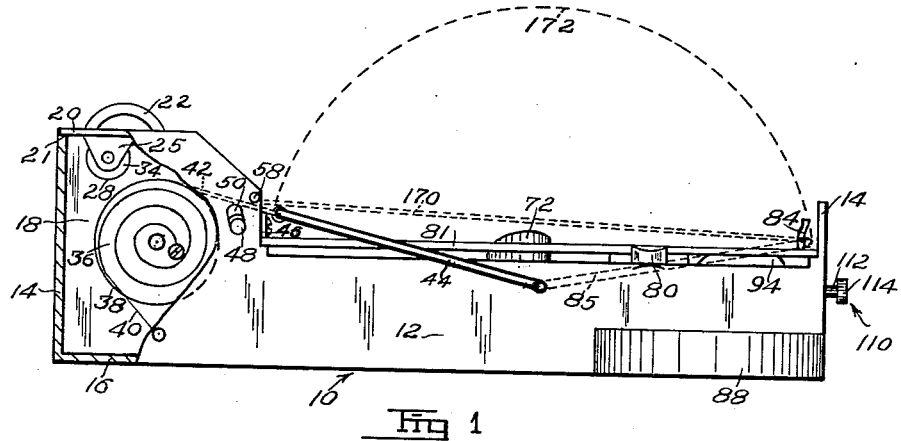
FIGURE 1 is a side elevation view of the device constituting the applicant's invention, with a portion of the housing broken away to show the coil spring on the end of the drum.

For a more detailed discussion of the invention, reference is made to the drawings in which numeral 10 designates a housing having two sides 12, a pair of ends 14 and an integral base 16. An enlarged section 18, at one end of the housing, has a removable cover 20 supported on an inwardly disposed lateral seat 21 provided on the sides 12 and end 14 of the housing 10.

A suitable handle 22 is provided on the upper side of the removable cover 20. A pair of dependent brackets 24 and 25, adjacent each end of the removable cover 20, have therebetween rotatably mounted rollers 26 and 28 respectively. The back roller 26 is covered with a suitably porous material 30, such as sheepswool, and is disposed in a trough 32 connected at each end to the sides 12 of the housing 10.

The front roller 28, on the removable cover 20, is covered with absorbent material 34, such as sponge rubber. A drum 36, having terminal retainer end flanges 38, is rotatably mounted in the housing 10 below the removable cover 20. A helical spring 40 is connected between one end of the rotatable drum 36, and the adjacent side 12 of the housing 10 so as yieldably to hold the drum 36 in its retracted position, as shown in FIGURE 1.

A sheet 42, of non-porous material such as rubber, is attached at one end to the rotatable drum 36, and wrapped therearound several times. The sheet 42 is permanently attached at the other end to a substantially U shaped member 44 pivoted at the ends of the sides 12 of the housing. An applicator roller 46 has end pintles 48 cradled in elongated slots 50 in the sides 12 of the housing 10.

The applicator roller 46 is covered with a porous material 52, such as sheepswool, and provided on one end with a manipulator handle 54. A trough 56 is disposed directly below the applicator roller 46, and attached at each end to the sides 12 of the housing 10. A transverse guide rod 58 is mounted between the sides 12 of the housing 10 immediately above the sheet 42.

An elongated wiper strip 60 is mounted on a divider wall 64 in the housing 10 immediately below the sheet 42. A cover plate 66 is detachably mounted on the back portion of the housing 10, by means of screws 68 threadably engaged in corner bosses 69. A length indicator 72 has a dependent locator pin 74 slidably engaged in a medial slot 76 provided in the cover plate 66.

Graduations 78 are provided on each side of the medial slot 76 in the cover plate 66 for use in conjunction with the length indicator 72. Two width indicators 80 are slidably held on the cover plate 66 by longitudinal strips 81 on the housing 10. Graduations 82 are provided on each side of the cover plate 66 for use in conjunction with the width indicator 80.

A pair of spaced upstanding resilient clips 84 are provided adjacent the rear end of the cover plate 66 for yieldably holding the U shaped member 44 in the broken line position shown in FIGURE 1. A pair of lateral extensions 86 are formed on the base 16 at the rear end of the housing 10. An upstanding peripheral rim 88 is provided on each of the lateral extensions 86. Two spaced arch detectors 90 are mounted in the rear portion of the cover plate 66.

A plunger 92, in each of the arch detectors 90, has a head 94, and a stem 96 thereon slidably retained in a boss 98 on the base 16 of the housing 10. A rearwardly disposed opening 100 is provided in the head 94 of each plunger 92. A vertically disposed spiral groove 102 is cut in the stem 96 of the plunger 92. An indicator hand 104 has an opening 105 in one end for reception of the stem 96 on the plunger 92, and an inwardly disposed tab 106 projecting into the opening 105 for registration with the spiral groove 102.

Figure 2:
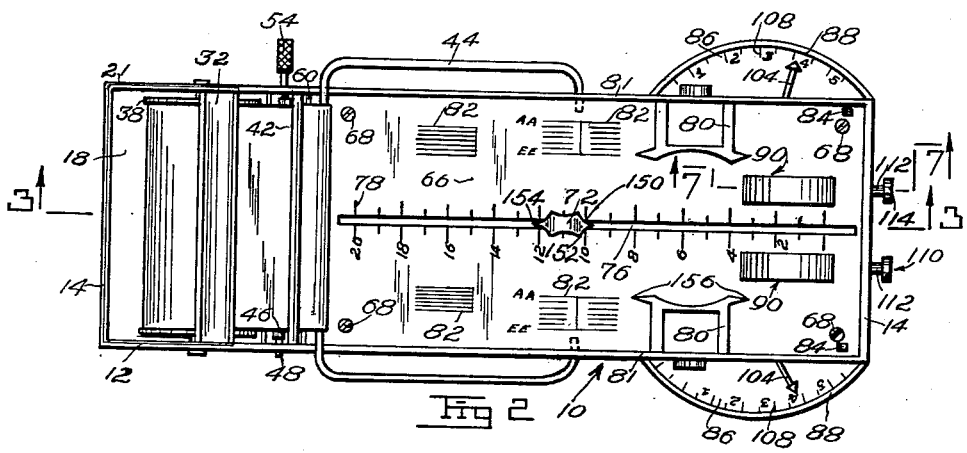
FIGURE 2 is a plan view of the device shown in FIGURE 1, with the end cover removed to show structural details of the device.
Figure 3:
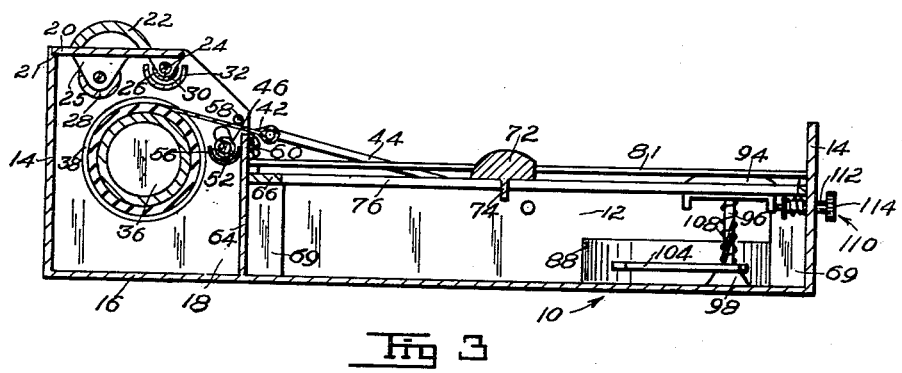
FIGURE 3 is a section view taken substantially on plane 3—3 in FIGURE 2 showing structural details of the arch detector.
Figure 4:
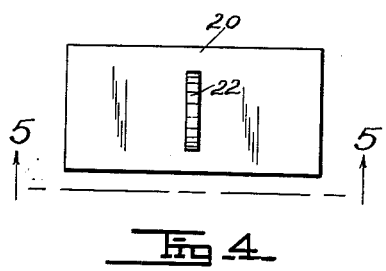
FIGURE 4 is a plan view of the end cover removed from the housing, showing its characteristic shape.
Figure 5:
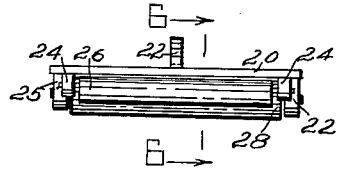
FIGURE 5 is an elevation view taken substantially on plane 5—5 in FIGURE 4 showing the relative size of the rollers attached to the end cover.
Figure 6:
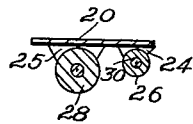
FIGURE 6 is a section view taken substantially on plane 6—6 in FIGURE 5 showing the relative location of the two rollers on the end cover.
Figure 7:
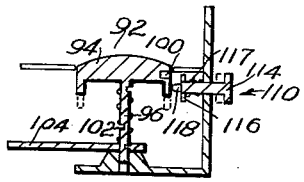
FIGURE 7 is a section view taken substantially on plane 7—7 in FIGURE 2 showing structural details of the arch detector components.
Figure 8:
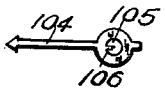
FIGURE 8 is a plan view of the indicator on the arch detector components removed from the assembly so as to show structural details.
Figure 9:
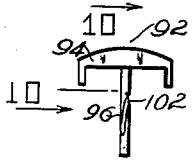
FIGURE 9 is an elevation view of the movable plunger, on the arch detector component, removed from the assembly so as to show the spiral groove on the stem.
Figure 10:
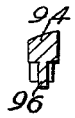
FIGURE 10 is a section view taken substantially on plane 10—10 in FIGURE 9, showing the characteristic shape of the head on the plunger.
Figure 11:
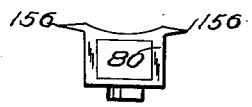
FIGURE 11 is a plan view of the width indicator shown in FIGURE 1 detached from the foot measuring device so as to show its characteristic shape.

A coil spring 108 interposed between the under side of the head 94 and the upper side of the indicator hand 104, yieldably holds the plunger 92 at its upper limit of travel, shown in FIGURES 1, 2 and 3. Spaced graduations 108 are provided on the lateral extensions 86 for use in conjunction with the indicator hand 104. A pair of spaced retainer units 110 are mounted on the back of the housing 10, in alignment with the arch detectors 90.

Each of the retainer units 110 has a rod 112 extending through the end 14 of the housing 10, with a knob 114 on the outer end and a key 116 at the inner end. A spiral spring 117, between the key 116 and the end 14 of the housing 10, urges the rod 112 to a forward position. A locator pin 118 on the forward end of the rod 112 registers with the rearwardly disposed opening 100 in the head 94 of the plunger 92 when the same is sufficiently depressed.

The above discussion completes a detailed description of the structure characterizing the preferred embodiment of the applicant's invention; however, to provide a more thorough understanding of the subject matter herein disclosed, a brief discussion will be directed to the manner in which the device operates in performing its intended function.

In use, when it is desired to measure a customer's feet, the applicant's device is placed in the position shown in FIGURE 2, with the sheet 42 in a retracted position on the drum 36. The customer's feet are then placed on the cover plate 66, one on each side of the medial slot 76, with the heels against the back end 14 of the housing 10. The length indicator 72 is next moved into contact with the customer's feet, so that the large toes rest in the two concavities 150 on each side of the length indicator 72.

The two points 152 on each side of the length indicator 72 then accurately indicate the size of the customer's feet on the graduations 78 of the cover plate 66. The length indicator 72 may also be turned transversely in the medial slot 76, should it prove more convenient in measuring certain feet. In this position, the customer's toes make contact with the concave surfaces 150 at each end of the length indicator 72. The two points 154 on the length indicator 72, then accurately indicate the size of the customer's feet on the graduations 78 of the cover plate 66.

With the customer's feet still in this position on the cover plate 66, the width indicators 80 are brought into contact with the widest part of the customer's feet. The pointers 156 on the width indicators 80 then accurately show the width of both feet on the graduations 82. While the customer's feet remain on the cover plate 66, the measurements on each arch will be shown by the indicator hands 104 on the graduations 108.

These three measurements for each of the customer's feet will enable them to be properly fitted. It is common practice in the shoe business to designate a customer's arches by a key number ranging from 1 through 5. When such a key number for each arch is read from the graduations 108, it is then possible to select a corresponding pad or lift to correct a pair of standard shoes for a customer's feet.

Should an impression of the customer's feet be desired, the head 94 on each of the arch detectors 90 is depressed sufficiently to align the rearwardly disposed openings 100 therein with the locator pins 118 in the retainer units 110. Thereupon, the locator pins 118 are forced into the rearwardly disposed openings 100 in the head 94 of the arch detectors 90, by the spiral springs 117. The sheet 42 is then pulled to the broken line position 170 shown in FIGURE 1, where the U shaped member 44 is anchored behind the resilient clips 84 on the cover plate 66.

When the sheet 42 is being pulled to its broken line position 170 over the cover plate 66, the applicator roller 46 is manually lifted into contact with the under side of the sheet 42 by means of the manipulator handle 54, so as to cover it uniformly with ink or other printing media, which is contained in the trough 56. A section of paper, or other suitable material, not here shown, is then placed on the cover plate 66, beneath the sheet 42.

The customer's feet are next placed in the identical position required for taking the measurements previously described. By so doing, an accurate pedigraph of the customer's feet is impressed on the paper. This imprint enables the customer's feet to be accurately measured and properly fitted. In practice, a pedigraph is usually taken only when the plantar surfaces of a customer's feet are considered to exhibit special problems.

When a pedigraph has been taken, as previously described, it is desirable to sterilize the surface of the sheet 42 which received the customer's feet. To perform this operation, the cover 20 is first removed from the housing 10 by means of the handle 22, and held over the sheet 42. The cover 20 is then lowered so as to bring the back roller 26 thereon into contact with the sheet 42. The back roller 26 is passed over the entire length of the sheet 42 several times so as to make contact with the entire surface.

Since the back roller 26 is saturated with an appropriate antiseptic solution contained in the trough 32, it renders the top surface of the sheet 42 sterile. The surface of the sheet 42 is then dried by passing over it the absorbent front roller 28. When this sterilizing and drying operation has been completed, the cover 20 is returned to its position on the housing 10. The U shaped member 44 is then lifted from behind the resilient clips 84, and moved in the broken line position 172 to the full line position shown in FIGURES 1, 2 and 3.

As the U shaped member 44 is returned to this full line position, the helical spring 40 causes the drum 36 to rotate in a counter-clockwise direction, thus automatically winding the sheet 42 therearound for convenient storage. To prepare the applicant's foot measuring device for further use, the knobs 114, on the retainer units 110, are pulled so as to permit the head 94 on each of the plungers 92 to return to its normal position in the cover plate 66. Should it be desired to again use the device for obtaining a pedigraph, the steps previously described must again be repeated.

Based upon the foregoing discussion, the applicant is of the opinion that his invention has fulfilled a long felt need in the field of foot measuring devices, and has accordingly made a valuable contribution to the related art. However, while this invention was described with reference to the structural details of a single embodiment, it will be appreciated by those skilled in the art, that the principles involved are susceptible of numerous other practical applications.

Therefore, I claim as new, and wish to secure by Letters Patent:

1. A foot measuring device comprising a housing having a flat surface with two spaced openings therein, a contoured head in each of the spaced openings mounted for travel between a retracted and extended position, resilient means yieldably holding the contoured heads in the extended position, indicated means on the housing, actuating means controlled by travel of the contoured heads for operating the indicating means, removable means on the housing for measuring the length of each foot, detachable means on the housing for measuring the width of each foot, means on the housing for releasably holding the contoured heads in a retracted position, a rotatable drum at one end of the housing, a sheet of material attached at one end to the rotatable drum and movable over the flat surface of the housing, and an applicator roller movable into contact with the underside of the sheet when the same is being moved over the flat surface of the housing.

2. A foot measuring device comprising a housing having therein two spaced openings, a contoured head in each of the spaced openings, a stem on each contoured head mounted for limited travel in the housing, resilient means on each stem yieldably holding the same in a pre-selected position, a spiral groove on each of the stems, a pair of graduated scales on the housing, and an indicating hand on each of the stems having a tab engaged in the spiral groove so that any travel of the stem results in a corresponding movement of the indicating hand over the graduated scales on the housing.

3. A foot measuring device comprising a housing having thereon a flat surface, a drum rotatably mounted in the housing, yieldable means for automatically rotating the drum in one direction, a sheet attached at one end to the drum and wrapped therearound, an operator member attached to the other end of the sheet and pivoted on the housing, such operator member when moved in one direction pulls the sheet over the flat surface of the housing, and when moved in the opposite direction permits the sheet automatically to wrap around the drum, a transverse trough in the housing disposed below the sheet and an applicator roller supported in the trough manually movable into contact with the under side of the sheet.

References Cited in the file of this patent
UNITED STATES PATENTS

| | | |
|---|---|---|
| 1,225,500 | Rosino | May 8, 1917 |
| 1,313,048 | Arrowsmith | Aug. 12, 1919 |
| 1,433,215 | McCamant | Oct. 24, 1922 |
| 1,973,435 | Hiss | Sept. 11, 1934 |
| 2,078,368 | Brannock | Apr. 27, 1937 |
| 2,782,504 | Del Presco | Oct. 20, 1957 |
| 2,831,250 | Greve | Apr. 22, 1958 |